(12) United States Patent
Sasaoka

(10) Patent No.: US 8,687,931 B2
(45) Date of Patent: Apr. 1, 2014

(54) OPTICAL FIBER

(71) Applicant: Sumitomo Electric Industries, Ltd., Konohana-ku (JP)

(72) Inventor: Eisuke Sasaoka, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 13/745,248

(22) Filed: Jan. 18, 2013

(65) Prior Publication Data

US 2014/0064684 A1    Mar. 6, 2014

Related U.S. Application Data

(62) Division of application No. 12/689,596, filed on Jan. 19, 2010, now abandoned.

(30) Foreign Application Priority Data

Jan. 19, 2009   (JP) .................... 2009-009095

(51) Int. Cl.
*G02B 6/032*    (2006.01)
*G02B 6/036*    (2006.01)

(52) U.S. Cl.
USPC .......................................... 385/125; 385/126

(58) Field of Classification Search
USPC ......................................... 385/123, 125, 126
See application file for complete search history.

(56) References Cited

U.S. PATENT DOCUMENTS

| | | |
|---|---|---|
| 4,000,416 A | 12/1976 | Goell |
| 4,026,693 A | 5/1977 | Sato |
| 4,304,584 A | 12/1981 | Borrelli et al. |
| 4,409,477 A | 10/1983 | Carl |
| 4,820,010 A | 4/1989 | Scifres et al. |
| 5,155,790 A | 10/1992 | Hwang |
| 5,216,738 A | 6/1993 | Feder |

(Continued)

FOREIGN PATENT DOCUMENTS

| | | |
|---|---|---|
| CN | 101281275 A | 10/2008 |
| GB | 2 138 165 A | 10/1984 |

(Continued)

OTHER PUBLICATIONS

K. Takenaga et al., "Evaluation of High-Power Endurance of Bend-Insensitive Fibers," Proceedings of 2008IEICE General Conference B-10-23, Mar. 18-21, 2008, p. 306 with English Translation.

(Continued)

*Primary Examiner* — Charlie Peng
(74) *Attorney, Agent, or Firm* — McDermott Will & Emery LLP

(57) ABSTRACT

The present invention relates to an optical fiber having a structure to enable both prevention of resin coating combustion due to leaked light, and low-loss light transmission. The optical fiber comprises a core region, and a cladding region. The cladding region is constituted by an optical cladding which affects the transmission characteristics of light propagating in the core region, and a physical cladding which does not affect the transmission characteristics of light propagating in the core region. Particularly, a leakage reduction portion is provided in the physical cladding so as to surround an outer periphery of the core region through the optical cladding. The leakage reduction portion functions to suppress propagation of the leaked light propagating from the core region toward outside the cladding region.

4 Claims, 6 Drawing Sheets

(56) References Cited

U.S. PATENT DOCUMENTS

| | | | |
|---|---|---|---|
| 5,381,505 A | 1/1995 | Fischietto et al. | |
| 5,655,043 A | 8/1997 | Davies et al. | |
| 5,712,941 A | 1/1998 | Imoto et al. | |
| 5,734,773 A | 3/1998 | Teshima et al. | |
| 6,188,824 B1 | 2/2001 | Teshima | |
| 6,280,850 B1 | 8/2001 | Oh et al. | |
| 6,483,974 B1* | 11/2002 | Waarts | 385/123 |
| 6,611,648 B2 | 8/2003 | Kumar et al. | |
| 6,856,743 B2 | 2/2005 | Bickham | |
| 6,925,239 B2 | 8/2005 | Wang et al. | |
| 6,937,805 B2* | 8/2005 | Aikawa et al. | 385/127 |
| 7,072,532 B2 | 7/2006 | Watts | |
| 7,142,756 B2* | 11/2006 | Anderson et al. | 385/125 |
| 7,164,835 B2 | 1/2007 | Matsuo et al. | |
| 7,283,714 B1 | 10/2007 | Gapontsev et al. | |
| 7,289,707 B1 | 10/2007 | Chavez-Pirson et al. | |
| 7,450,807 B2 | 11/2008 | Bickham et al. | |
| 7,526,166 B2* | 4/2009 | Bookbinder et al. | 385/125 |
| 7,526,169 B2 | 4/2009 | Bickham et al. | |
| 7,755,838 B2 | 7/2010 | Chaves et al. | |
| 7,760,978 B2 | 7/2010 | DiGiovanni et al. | |
| 7,787,731 B2 | 8/2010 | Bookbinder et al. | |
| 7,787,733 B2 | 8/2010 | DiGiovanni et al. | |
| 7,889,960 B2 | 2/2011 | de Montmorillon et al. | |
| 7,899,294 B2 | 3/2011 | Chen et al. | |
| 7,903,918 B1 | 3/2011 | Bickham et al. | |
| 8,081,854 B2 | 12/2011 | Yoon et al. | |
| 8,081,855 B2 | 12/2011 | Nakanishi et al. | |
| 8,081,856 B2 | 12/2011 | Nakanishi et al. | |
| 8,131,125 B2 | 3/2012 | de Montmorillon et al. | |
| 8,145,025 B2* | 3/2012 | de Montmorillon et al. | 385/127 |
| 8,145,027 B2* | 3/2012 | Overton et al. | 385/128 |
| 8,189,978 B1 | 5/2012 | Bennett et al. | |
| 8,301,001 B2 | 10/2012 | Nakanishi et al. | |
| 2002/0021501 A1 | 2/2002 | Kawashima et al. | |
| 2002/0126971 A1 | 9/2002 | Soufiane | |
| 2002/0176677 A1 | 11/2002 | Kumar et al. | |
| 2003/0031436 A1 | 2/2003 | Simmons et al. | |
| 2003/0108318 A1* | 6/2003 | Arai et al. | 385/127 |
| 2004/0105642 A1* | 6/2004 | Bickham | 385/127 |
| 2004/0252961 A1 | 12/2004 | Peuchert et al. | |
| 2005/0111801 A1 | 5/2005 | Garman et al. | |
| 2006/0034574 A1* | 2/2006 | Guan et al. | 385/125 |
| 2008/0013905 A1 | 1/2008 | Bookbinder et al. | |
| 2008/0056658 A1 | 3/2008 | Bickham et al. | |
| 2008/0205840 A1 | 8/2008 | Wakabayashi et al. | |
| 2008/0279517 A1 | 11/2008 | Bickham et al. | |
| 2009/0067793 A1 | 3/2009 | Bennett et al. | |
| 2009/0279835 A1 | 11/2009 | de Montmorillon et al. | |
| 2009/0279836 A1 | 11/2009 | de Montmorillon et al. | |
| 2010/0290781 A1 | 11/2010 | Overton et al. | |
| 2011/0052129 A1 | 3/2011 | Sasaoka | |
| 2011/0135264 A1 | 6/2011 | de Montmorillon et al. | |
| 2011/0206330 A1 | 8/2011 | Sasaoka | |
| 2011/0222828 A1 | 9/2011 | Sasaoka et al. | |
| 2012/0014077 A1 | 1/2012 | Reimund | |
| 2012/0134637 A1 | 5/2012 | Imamura | |

FOREIGN PATENT DOCUMENTS

| | | |
|---|---|---|
| JP | 58-013504 A | 1/1983 |
| JP | S63-060123 A | 3/1988 |
| JP | H9-021919 A | 1/1997 |
| JP | 10-168409 A | 6/1998 |
| JP | 2006194925 A | 7/2006 |
| JP | 2008-534995 A | 8/2008 |
| WO | WO-91/15786 A1 | 10/1991 |
| WO | WO-2008/157341 A2 | 12/2008 |

OTHER PUBLICATIONS

S. Matsuo et al., "Design Optimization of Trench Index Profile for the same dispersion characteristice with SMF," OFC2007, JWA2, Mar. 25, 2007.

Kazumasa Osono et al., "Development of High Efficiency Holey Fibers," Hitachi Densen, No. 26, Jan. 2007, pp. 71-76.

International Search Report issued in International Patent Application No. PCT/JP2010/050523 dated Feb. 16, 2010.

R.S. Romaniuk et al., "Multicore Optical Fiber Components," Proceedings of the SPIE, SPIE, US, vol. 722, 22 Sep. 1986, pp. 117-124, XP000198335.

European Search Report issued in European Patent Application No. EP 10151183.0 dated May 6, 2010.

European Search Report issued in European Patent Application No. 10000304.4-2216, dated May 7, 2010.

European Search Report issued in European Patent Application No. 10000304.5-2216/2209029, dated Jul. 1, 2010.

European Search Report issued in European Patent Application No. EP 10151183.0 dated Sep. 24, 2010.

English translation of International Preliminary Report on Patentability (Chapter I) issued in International Patent Application No. PCT/JP2010/050523 dated Aug. 25, 2011.

United States Office Action, issued in U.S. Appl. No. 12/690,496, dated Mar. 12, 2012.

US Office Action issued in U.S. Appl. No. 12/743,175 dated Jun. 18, 2012.

Thomson, R.R., et al. "Ultrafast-laser Inscription of a Three Dimensional Fan-out Device for Multicore Fiber Coupling Applications." Optics Express. Sep. 3, 2007. vol. 15. No. 18, pp. 11691-11697.

United States Notice of Allowance issued in U.S. Appl. No. 12/690,496 dated Jul. 27, 2012.

United States Notice of Allowance issued in U.S. Appl. No. 12/743,175 dated Jan. 15, 2013.

Japanese Office Action (Notice of Reasons for Rejection) with English Translation issued in Patent Application No. P2010-010103 dated Sep. 10, 2013.

United States Office Action issued in U.S. Appl. No. 13/744,745 dated Apr. 22, 2013.

Chinese Office Action, w/ English translation thereof, issued in Chinese Patent Application No. CN 201010001271.0 dated Oct. 31, 2013.

United States Office Action issued in U.S. Appl. No. 12/689,596 dated Jul. 25, 2012.

United States Office Action issued in U.S. Appl. No. 12/689,596 dated Feb. 23, 2012.

Entire Prosecution History of U.S. Appl. No. 12/689,596, filed Jan. 19, 2010 entitled Optical Fiber.

Notice of Allowance issued in U.S. Appl. No. 13/744,745 dated Aug. 13, 2013.

Japanese Office Action issued in Japanese Application No. P2010-54668 dated Dec. 10, 2013, with English Translation.

Japanese Office Action issued in Japanese Application No. 2010-010103 dated Nov. 12, 2013, with English translation, 3 pages.

* cited by examiner

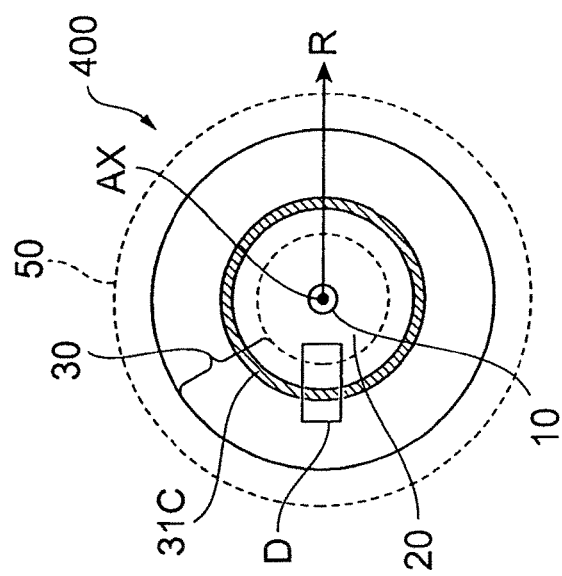
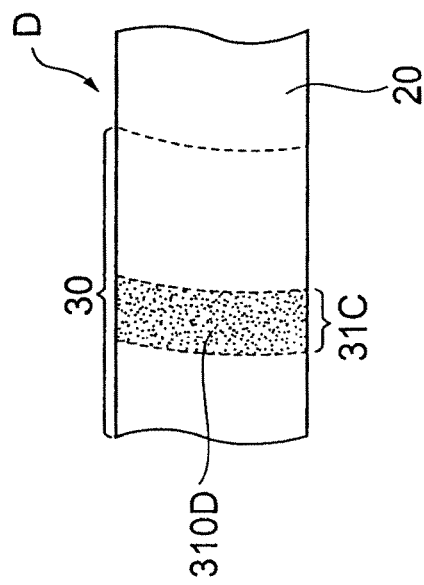

OPTICAL FIBER

CROSS-REFERENCE TO RELATED APPLICATION

This application is a divisional of U.S. application Ser. No. 12/689,596 filed Jan. 19, 2010 which claims priority from Japanese Patent Application No. 2009-009095 filed Jan. 19, 2009.

BACKGROUND OF THE INVENTION

1. Field of the Invention

The present invention relates to an optical fiber which is suitable as a transmission medium for optical communication, and in particular relates to an optical fiber having excellent high-power endurance.

2. Related Background of the Invention

At present, optical fiber communication networks are being expanded from trunk lines to ordinary homes, and are gaining wide recognition as FTTH (Fiber To The Home) services. Nearly all the optical fibers employed in such communication networks are silica-based fibers; by adding a refractive index increaser such as for example $GeO_2$ to the core region, full-reflection optical waveguide structures having a refractive index difference, with the cladding are obtained.

For example, in Document 1: Proceedings of 2008 TRICE General Conference, B-10-24, p. 306 (Mar. 18 to 21, 2008), it is noted that when small-radius bending is applied to an optical fiber in a state in which high-power light is propagating in the optical fiber, there is the possibility that light leaking from the core due to this bending may cause combustion of the resin coating. Also, in Document 1, it is noted that rises in temperature of the resin coating depend on the amount of increase in loss arising from bending. That is, in Document 1, it is stated that for bending at the same bending radius, a fiber with smaller loss increase due to bending, such as for example a trench fiber or a HAF (Hole-Assisted fiber), is desirable.

Also, Document 2: OFC2007, JWA2 (Mar. 25, 2007) describes trench fibers with a small loss increase arising from bending. For example, referring to Table 1 in which are compared the characteristics of trench fibers and single-mode fibers (SMFs) which are standard step-index type fibers, the attenuation is seen to be greater for a trench fiber than for a standard SMF at wavelengths of both 1310 nm and 1550 nm.

Further, Document 3: "HITACHI DENSEN", No. 26, pp. 71 to 76 (January 2007) describes a hole-assisted fiber with a small loss increase arising from bending. In this Document 3, it is stated that the propagation loss of the hole-assisted fiber is 0.50 dB/km and 0.35 dB/km at wavelengths of 1.31 μm and 1.55 μm respectively. These values are still larger than those of the trench fibers described in the above-mentioned Documents 1 and 2.

SUMMARY OF THE INVENTION

The present inventors have examined the above conventional optical fibers, and as a result, have discovered the following problems.

For example, when bending with a small radius of curvature (hereinafter referred to as "small-radius bending") is applied to an optical fiber during high-power light propagation, light leaking from the core region (light propagating toward a side face of the optical fiber arising from small-radius bending) reaches the resin coating, with the possibility that combustion of the resin coating might be caused. The trench fibers and hole-assisted fibers described in Documents 1 to 3 above are thought to be useful for making such combustion of the resin coating less likely. However, in all such trench fibers and hole-assisted fibers, propagation losses are larger than in standard SMFs, and in the prior art it has not been possible to achieve both prevention of resin coating combustion, and low propagation losses.

That is, in both trench fibers and hole-assisted fibers, light confinement in the core region is reinforced by positioning a steep refractive index reduced portion (the region in which a trench or holes are formed) in proximity to the core region. Consequently in such trench fibers and hole-assisted fibers, a structure is realized in which light leakage from a core region subjected to bending does not readily occur. On the other hand, the steep refractive index reduced portion itself in proximity to the core region, or the interface at which the steep reduction in refractive index occurs, becomes a cause of large propagation losses relative to the core region or similar, so that propagation losses in trench fibers and hole-assisted fibers are larger than in standard SMFs not having refractive index reduced portions formed by trenches or holes.

This inability to achieve both prevention of resin coating combustion and low-loss light transmission may become a major obstacle to the future realization of long-haul, large-capacity transmission.

In general, in order to realize long-haul optical transmission using an optical fiber as the transmission medium, clearly an optical fiber with lower propagation loss is desirable. When using wavelength-multiplexed transmission means to achieve large-capacity transmission, signal light at a larger number of wavelengths must be injected into the optical fiber to achieve greater transmission capacity. In addition, when raising the modulation rate or increasing the modulation level as means to achieve large-capacity transmission, in order to maintain an error rate comparable to that of conventional optical transmission, the optical SN ratio must be improved. In particular, the optical power input to the optical fiber must be increased. In any of these cases, the total optical power propagating in the optical fiber must be increased, so that together with prevention of the occurrence of coating combustion and similar during high-power propagation, the achievement of lower propagation losses is also desired.

The present invention has been developed to eliminate the problems described above. It is an object of the present invention to provide an optical fiber comprising a structure to achieve both prevention of resin coating combustion arising from light leaking from the light-guiding region, and low propagation losses.

An optical fiber according to the present invention comprises a core region extending along an optical axis, and a cladding region provided on an outer periphery of the core region. The cladding region is constituted by an optical cladding, as a region which affects the transmission characteristics of light propagating within the core region, provided on an outer periphery of the core region, and a physical cladding, as a region which does not affect the transmission characteristics of light propagating within the core region, provided on an outer periphery of the optical cladding. Particularly, in order to resolve the above problems, a leakage reduction portion is provided in the physical cladding of the optical fiber according to the present invention, while surrounding the outer periphery of the core region, through the optical cladding. The leakage reduction portion is a region provided to suppress the propagation, outside the cladding region, of the leaked light which has arrived from the core region via the optical cladding, and the boundary of the optical cladding and the physical cladding either coincides with the inner diameter of the leakage reduction portion, or is positioned on the inside of the leakage reduction portion.

As described above, in the optical fiber according to the present invention, the leakage reduction portion is provided within the physical cladding which does not affect the transmission characteristics of light propagating within the core region. Hence, in the state in which the optical fiber is not being bent, the existence of the leakage reduction portion does not affect transmission characteristics of light propagating within the core region. On the other hand, when the optical fiber is bent to a small radius of curvature, a portion of the light propagating within the core region propagates from the core region positions at the bent portion toward the outside of the optical fiber as leaked light. Under these circumstances, the leakage reduction portion provided in the physical cladding functions so as to reduce the light quantity of leaked light propagating from the core region toward the outside of the optical fiber. As a result, both prevention of combustion of the resin coating due to the leaked light (reduction of the leaked light arriving at the optical fiber resin coating) and low-loss optical transmission, which has been difficult to achieve in the prior art described above, become possible.

In the optical fiber according to the present invention, it is preferable that in a cross-section of the optical fiber orthogonal to the optical axis, the position where the leakage reduction portion is between the position, where a distance from the optical axis is 5/2 times the mode field diameter (MFD) of the optical fiber at wavelength 1.55 μm, and an outer surface of the cladding region. This is because in this region, there is no effect on the transmission characteristics of light propagating within the core region. It is still more preferable that, in a cross-section of the optical fiber orthogonal to the optical axis, the leakage reduction portion be provided between the position, where the electric field amplitude in the optical fiber is $10^{-4}$ of the peak value or less, and the outer surface of the cladding region. Hence, the above-described position which is 5/2 of the MFD, or the position at which the electric field amplitude is $10^{-4}$ of the peak value, means the boundary position of the optical cladding and the physical cladding.

In the optical fiber according to the present invention, in a state that the optical fiber is bent at a predetermined radius, the leakage reduction portion reduces the ratio of the light quantity of leaked light, passing through the leakage reduction portion, to the light quantity of leaked light arriving from the bent portion of the core region to 1/10 or less. This reduction in light quantity of the leaked light in the leakage reduction portion is achieved by causing deflection of the leaked light, or by absorption of a portion of the leaked light.

Deflection control for the leaked light can for example be achieved by (1) means to confine the leaked light arriving from the core region within the inside region positioned on the core region side of the leakage reduction portion; (2) means to cause propagation of the leaked light which has arrived from the core region within the leakage reduction portion; and, (3) means to increase scattering of the leaked light which has arrived from the core region.

In particular, deflection control through confinement of the leaked light can be achieved by providing holes or trenches in the leakage reduction portion, extending along the core region. That is, the existence of these holes or trenches effectively blocks the leaked light arriving from the core region. Also, deflection control by propagation of the leaked light can be achieved by setting the refractive index of the leakage reduction portion to be higher than the refractive indices of those of the optical cladding positioned on the inside of the leakage reduction portion, and the physical cladding from which the leakage reduction portion is excluded. That is, by setting the refractive index high, the leakage reduction portion itself functions as an optical waveguide region. Further, deflection control by increasing scattering of the leaked light can be achieved by adding a minute anisotropic member into the leakage reduction portion. That is, the existence of such a minute anisotropic member causes disordering of the traveling direction of the leaked light arriving from the core region.

DESCRIPTION OF THE PREFERRED EMBODIMENTS

Figure 1:
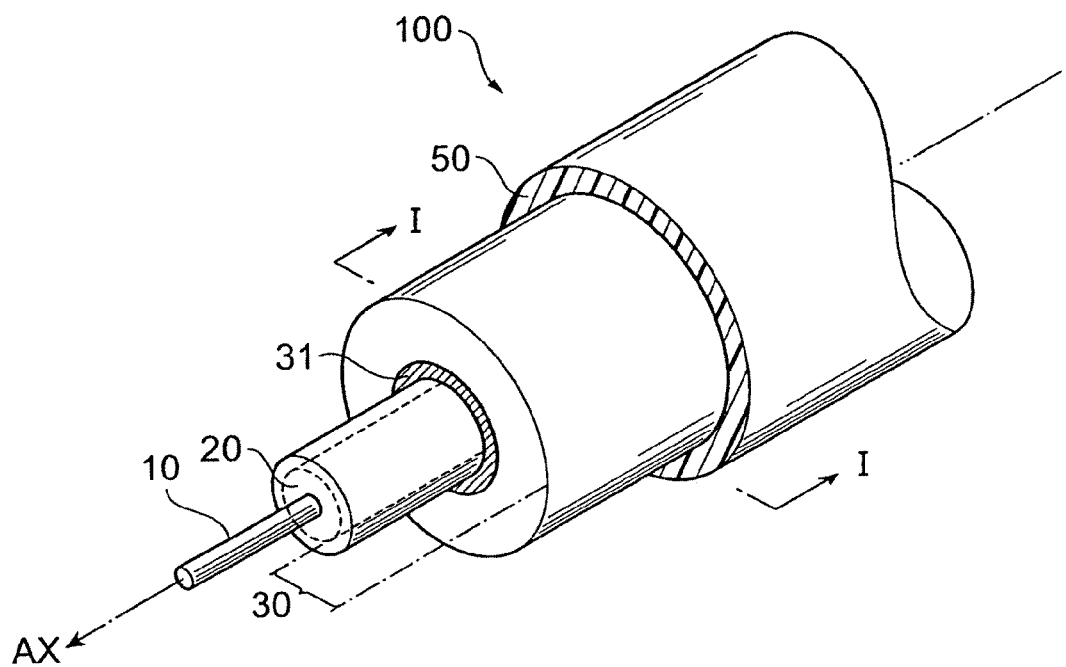
FIG. 1 is a perspective view showing the schematic structure of a first embodiment of an optical fiber according to the present invention.

In the following, embodiments of an optical fiber according to the present invention will be explained in detail with reference to FIGS. 1, and 2A to 6B. In the description of the drawings, identical or corresponding components are designated by the same reference numerals, and overlapping description is omitted.

First Embodiment

Figure 2A:
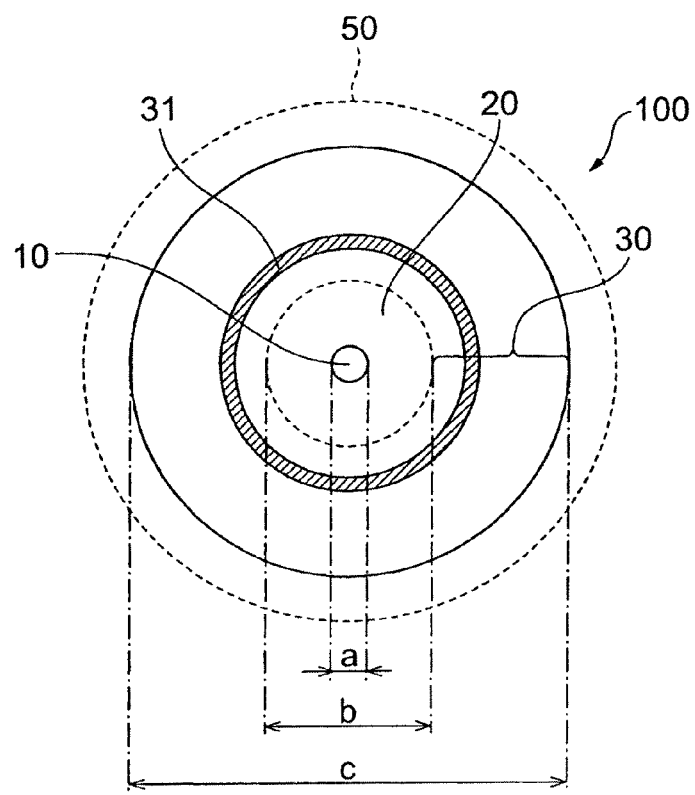
FIGS. 2A and 2B are a cross-sectional view showing the schematic structure of the first embodiment of an optical fiber according to the present invention and a refractive index profile thereof.
Figure 2B:
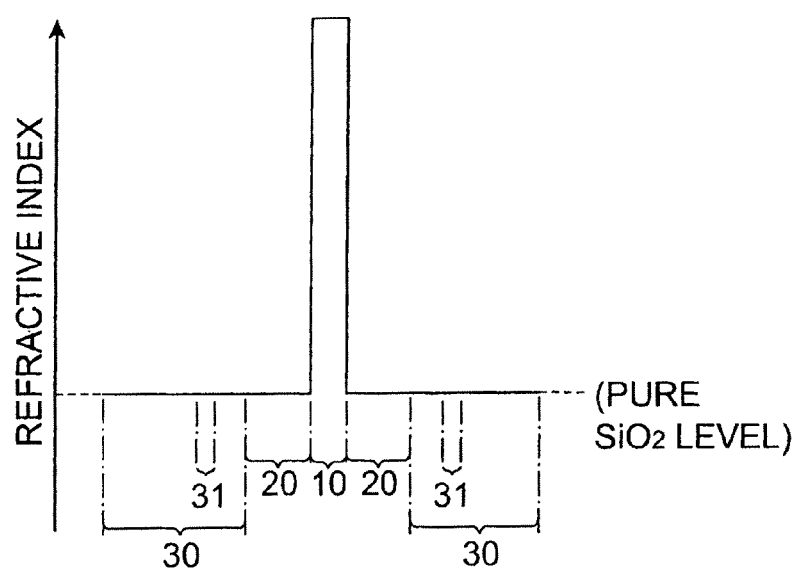

FIG. 1 is a perspective view showing the schematic structure of a first embodiment of an optical fiber according to the present invention. FIG. 2A shows the cross-sectional structure of the optical fiber according to the first embodiment orthogonal to the optical axis AX, and FIG. 2B is the refractive index profile thereof. The schematic structure of the optical fiber shown in FIG. 1 is a schematic structure common to the second through fourth embodiments explained below.

As shown in FIG. 1, the optical fiber 100 according to the first embodiment comprises a core region 10 extending along the optical axis AX, a cladding region provided on an outer periphery of the core region 10, and a resin coating (UV (ultraviolet) curable resin) 50 provided on an outer periphery of the cladding region. The cladding region is constituted by an optical cladding 20 provided directly on an outer periphery of the core region 10, and a physical cladding 30 provided on an outer periphery of the optical cladding 20. Also, the physical cladding 30 includes a leakage reduction portion 31 to reduce the light quantity of leaked light propagating from the core region 10 toward the surface of the cladding region (on the side of the resin coating 50). The optical cladding and the physical cladding are regions which are distinguished according to their functions in affecting or not affecting transmission characteristics, and cannot be distinguished in terms of composition or other structural aspects. In the attached drawings, for convenience the boundary between the optical cladding and the physical cladding is shown by a dashed line, to facilitate understanding according to the present invention.

The leakage reduction portion 31 in the first embodiment is a region doped with a light-absorbing material; due to the existence of the light-absorbing material, the leakage reduction portion 31 functions to effectively reduce the light quantity of leaked light from the core region 10. Further, in a cross-section of the optical fiber 100 orthogonal to the optical axis AX, the leakage reduction portion 31 is provided between the position, where a distance from the optical axis AX is 5/2 times the mode field diameter (MFD) of the optical fiber at wavelength 1.55 µm, and the outer surface of the cladding region (the interface between the physical cladding 30 and the resin coating 50). Or, the leakage portion 31 may be provided between the position, where the electric field amplitude in the optical fiber 100 is $10^{-4}$ of the peak value or less, and the outer surface of the cladding region.

FIGS. 2A and 2B show the specific structure of the optical fiber 100 according to the first embodiment. FIG. 2A shows the cross-sectional structure of the optical fiber 100 according to the first embodiment, and FIG. 2B shows the refractive index profile thereof. The cross-section shown in FIG. 2A is a cross-section of the optical fiber 100 along the line I-I in FIG. 1. The refractive index profile shown in FIG. 2B is equivalent to the refractive indices of each of the portions of the optical fiber 100 positioned on a line perpendicular to the optical axis AX.

The optical fiber 100 according to the first embodiment is a silica-based fiber, and as shown in FIGS. 2A and 2B, the core region 10 is composed of $SiO_2$ doped with $GeO_2$. The core region 10 has an outer diameter a of 8.5 µm, and has a relative reflective index difference of 0.35% with respect to the refractive index of the optical cladding 20. The optical cladding 20, with outer diameter b, and the physical cladding 30 (excluding the leakage reduction portion 31), with outer diameter c, both are composed of pure $SiO_2$. The outer diameter c of the physical cladding 30 is 125 µm. An optical fiber 100 having such a structure has an MFD of 10.2 µm at wavelength of 1.55 µm. Further, the electric field amplitude in the optical fiber 100 has a peak value in the center of the core region 10 (equivalent to the optical axis AX), and the position at which the amplitude is $10^{-4}$ of the peak value is at a distance of 28.5 mm from the optical axis AX. Hence the leakage reduction portion 31 is provided within the physical cladding 30, while being apart from the optical axis AX in the radial direction by 25.5 µm (a distance equal to 5/2 times the MFD) or more, or being apart from the optical axis AX in the radial direction by 28.5 µm or more.

Particularly, in the optical fiber 100, the leakage reduction portion 31 is a ring-shape region formed in the range from 35 µm to 50 µm from the optical axis AX.

Figure 3A:
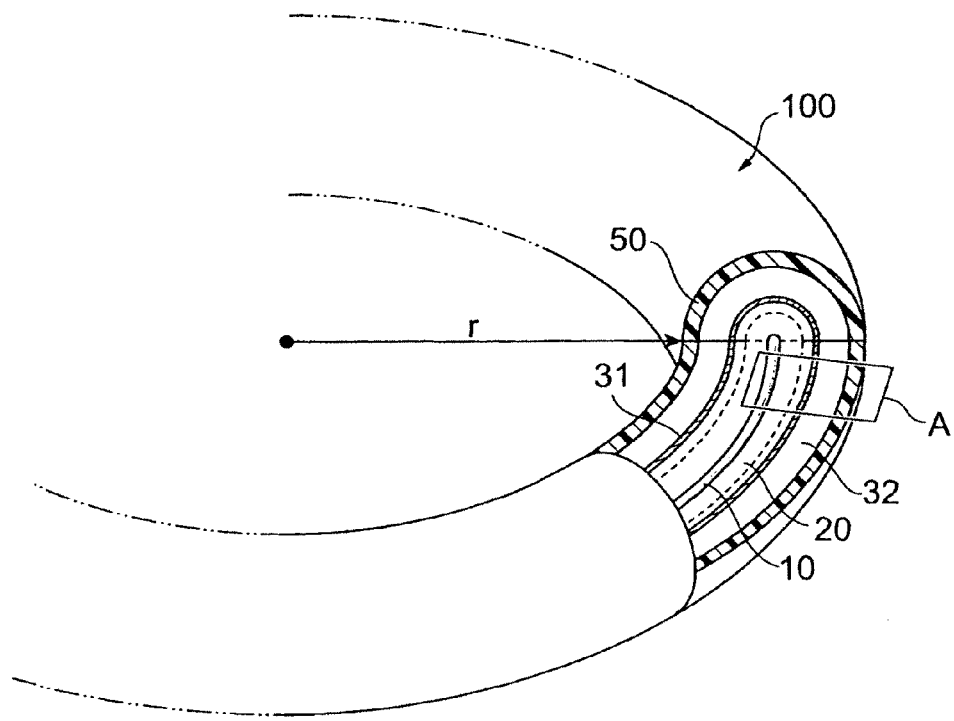
FIGS. 3A and 3B are drawings for explaining the mechanism of occurrence of light leakage and the function of the leakage reduction portion.
Figure 3B:
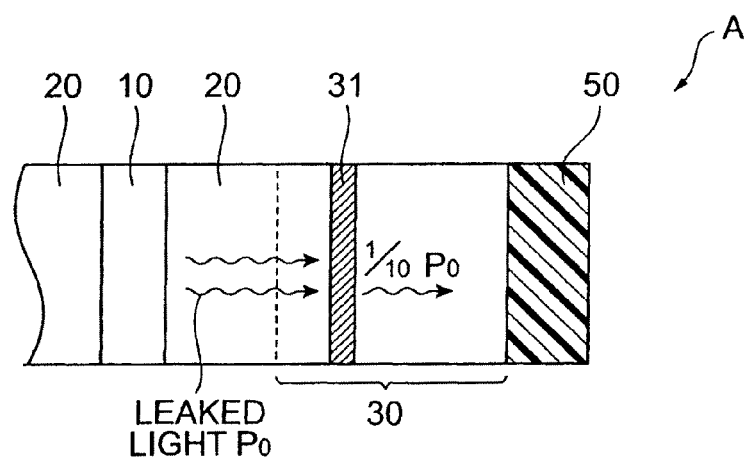

In the optical fiber 100 according to the first embodiment having the above-described structure, a leakage reduction portion 31 is formed within the physical cladding 30, so that in the state in which small-radius bending is not applied to the optical fiber 100, the light propagating within the core region 10 does not arrive at the leakage reduction portion 31 (the transmission characteristics of light propagating in the core region are not affected). However, when the optical fiber 100 is housed within a high-density optical cable to accommodate large-capacity optical communication, as shown in FIG. 3A small-radius bending with a radius of curvature r is applied to the optical fiber 100. Light leakage occurs from the core region 10 positioned in the region at which such small-radius bending is applied toward the resin coating 50. FIG. 3A is a partial sectioned diagram showing a state in which small-radius bending (radius of curvature r) is applied to the optical fiber 100; FIG. 3B is an enlarged view of the portion A in FIG. 3A.

In the optical fiber 100 according to the first embodiment, when small-radius bending causes the leaked light, which arrives in light quantity $P_0$ from the core region 10 at the leakage reduction portion 31, nearly all the leaked light is absorbed by optical absorber doped into the leakage reduction portion 31. In particular, the light quantity of leaked light passing through the leakage reduction portion 31 is reduced to 1/10 the light quantity $P_0$ of leaked light arriving at the leakage reduction portion 31 (see FIG. 3B). As a result, the possibility of occurrence of combustion of the resin coating 50 or other malfunctions arising due to arrival of the leaked light at the coating is effectively reduced.

In the above-described first embodiment, a structure was described in which the light quantity of leaked light from the core region 10 originating in small-radius bending is reduced through partial absorption by the leakage reduction portion 31; however, reduction of the light quantity of leaked light can also be achieved by causing deflection of the leaked light. Hence as the second to fourth embodiments below, specific means for causing deflection of the leaked light from the core region 10 are explained. In particular, deflection control for the leaked light can be achieved by means for confinement of the leaked light arriving from the core region within an inside region positioned on the core region side of the leakage reduction portion (second embodiment); by means for causing propagation of the leaked light arriving from the core region within the leakage reduction portion (third embodiment); and, by means for increasing scattering of the leaked light arriving from the core region (fourth embodiment).

Second Embodiment

Figure 4A:
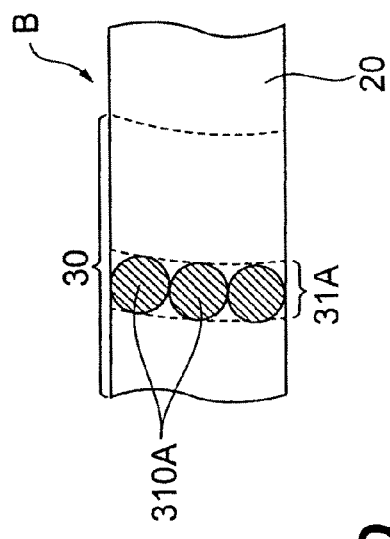
FIGS. 4A to 4D show the schematic structure of a second embodiment of an optical fiber according to the present invention.
Figure 4C:
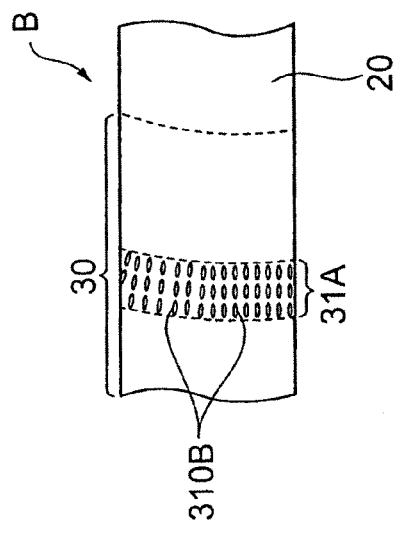
Figure 4B:
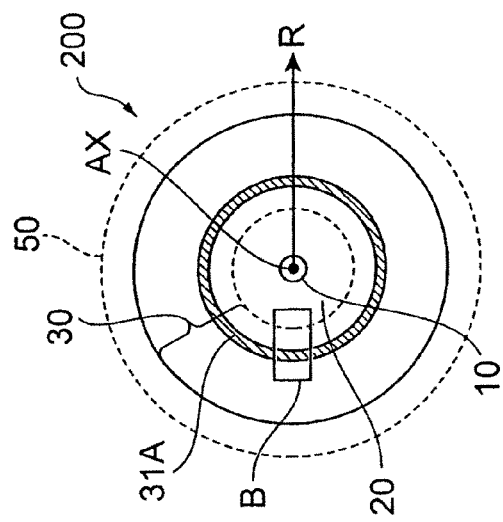
Figure 4D:
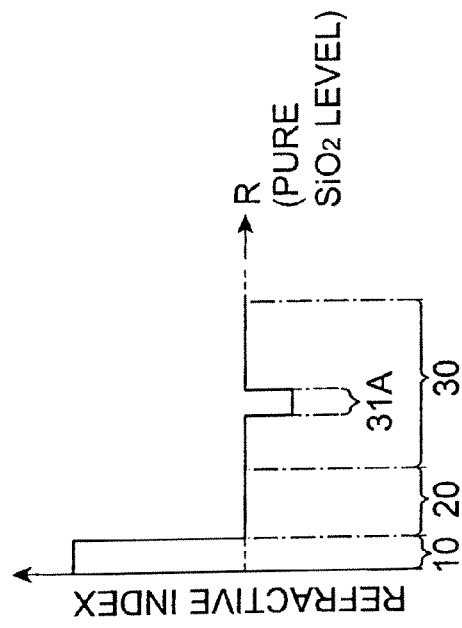

FIGS. 4A to 4D show the schematic structure of a second embodiment of an optical fiber according to the present invention. The second embodiment performs leaked light deflection control by confining leaked light within a region on the inside of the leakage reduction portion. FIG. 4A is a cross-sectional view showing the structure of the optical fiber 200 according to the second embodiment, and is equivalent to a cross-section along line I-I in FIG. 1. FIG. 4B is a refractive index profile of the optical fiber 200, and shows first means for achieving leaked light deflection control in the second embodiment. FIG. 4C is an enlarged view of the portion B in FIG. 4A, and shows second means for achieving leaked light deflection control in the second embodiment. FIG. 4D is an enlarged view of the portion B in FIG. 4A, and shows third means for achieving leaked light deflection control in the second embodiment.

The optical fiber 200 according to the second embodiment comprises a core region 10 extending along the optical axis AX, a cladding region provided on an outer periphery of the core region 10, and a resin coating (UV curable resin) 50 provided on an outer periphery of the cladding region. The cladding region is constituted by an optical cladding 20 provided directly on an outer periphery of the core region 10, and a physical cladding 30 provided on an outer periphery of the optical cladding 20. The physical cladding 30 includes a leakage reduction portion 31A to reduce the light quantity of leaked light propagating from the core region 10 toward the surface of the cladding region (on the side of the resin coating 50). With respect to the structure and functions of the leakage reduction portion 31A, the optical fiber 200 according to the second embodiment differs from the optical fiber 100 of the above-described first embodiment.

The leakage reduction portion 31A in the second embodiment functions to suppress propagation of leaked light to the resin coating 50 by confining leaked light which has propagated from the core region 10 in an inside region surrounded by the leakage reduction portion 31A.

The optical fiber 200 according to the second embodiment is silica-based fiber, similar to the optical fiber 100 according to the first embodiment. As shown in FIG. 4A, the core region 10 is composed of $SiO_2$ doped with $GeO_2$. The core region 10 has an outer diameter of 8.5 µm, and has a relative reflective index difference of 0.35% with respect to the refractive index of the optical cladding 20. The optical cladding 20 and physical cladding 30 (excluding the leakage reduction portion 31A) both are composed of pure $SiO_2$. The outer diameter of the physical cladding 30 is 125 µm. An optical fiber 200 having such a structure has an MFD of 10.2 µm at wavelength of 1.55 µm. Further, the electric field amplitude in the optical fiber 200 has a peak value in the center of the core region 10 (equivalent to the optical axis AX), and the position at which the amplitude is $10^{-4}$ of the peak value is at a distance of 28.5 µm from the optical axis AX. Hence the leakage reduction portion 31A is provided within the physical cladding 30, while being apart from the optical axis AX in the radial direction by 25.5 µm (a distance equal to 5/2 times the MFD) or more, or being apart from the optical axis AX in the radial direction by 28.5 µm or more.

Particularly, in the optical fiber 200, the leakage reduction portion 31A is a ring-shape region formed in the range from 35 µm to 50 µm from the optical axis AX.

FIG. 4B is a refractive index profile of the optical fiber 200, showing the first means to achieve leaked light deflection control in the second embodiment. In this first means, deflection control of leaked light is performed by adopting, as the refractive index profile of the optical fiber 200, a trench-structure refractive index profile. Specifically, by adding F in the $SiO_2$ region equivalent to the leakage reduction region 31A as in the refractive index profile shown in FIG. 4B, the relative refractive index difference of the leakage reduction portion 31A with respect to the optical cladding 20 is set to −0.7%.

Also, FIG. 4C is an enlarged view of the portion B in FIG. 4A, showing the second means of achieving leaked light deflection control in the second embodiment. This second means performs leaked light deflection control by providing a plurality of holes 310A, extending along the optical axis AX, in the region equivalent to the leakage reduction portion 31A.

Further, FIG. 4D is an enlarged view of the portion B in FIG. 4A, showing third means of achieving leaked light deflection control in the second embodiment. In this third means, leaked light deflection control is performed by forming a leakage reduction portion 31A in which voids 310B are scattered in the shaded portion in FIG. 4A, which is a region extending along the optical axis AX direction, coinciding with the length direction of the optical fiber 200.

By forming the leakage reduction portion 31A as a low-refractive index region, as a hole formation region, or as a void-scattered region, as in the above-described first to third means, the relative refractive index difference of the leakage reduction portion 31A relative to the optical cladding 20 is made significantly lower. As a result, a portion of the leaked light propagating from the core region 10 toward the optical cladding 20 due to small-radius bending or other causes is confined within the inside region surrounded by the leakage reduction portion 31A.

Here, the ratio of light confined in the inside region surrounded by the leakage reduction portion 31A, with respect to the whole leaked light which has passed through the optical cladding 20 and is propagating toward the resin coating 50, can be adjusted through the distance from the core region 10 to the leakage reduction portion 31A, the thickness of the leakage reduction portion 31A, the relative refractive index difference of the leakage reduction portion 31A with respect to the optical cladding in the configuration of the first means, the placement and other parameters of holes in the configuration of the second means, and the placement and other parameters of voids in the configuration of the third means. Hence the light quantity of leaked light which passes through the leakage reduction portion 31A can be reduced to 1/10 or less of the light quantity $P_0$ of leaked light arriving at the leakage reduction portion 31A via the optical cladding 20. By appropriately placing holes or voids, leaked light can be confined within the inside region surrounded by the leakage reduction portion 31A through the photonic bandgap effect.

In the second embodiment also, the leakage reduction portion 31A exists outside the position which is 5/2 of the MFD from the optical axis AX (the center of the core region 10), or the position at which the electric field amplitude in the optical fiber 200 is not more than $10^{-4}$ of the peak value. Hence the effect of the existence of the leakage reduction portion 31A on light propagating in the core region 10 is at a level which can effectively be ignored, and the effect of the leakage reduction portion on transmission losses and other characteristics is also at a level which can be ignored. Further, because a portion of the leaked light leaks outside the leakage reduction portion, the light component confined within the inside region of the leakage reduction portion also is gradually attenuated with propagation. Hence there is no renewed coupling of the light component confined within the inside region surrounded by the leakage reduction portion 31A with light propagating in the core region (the light component confined within the inside region of the leakage reduction portion can be effectively prevented from affecting the transmission characteristics of light propagating in the core region).

Third Embodiment

Figure 5C:
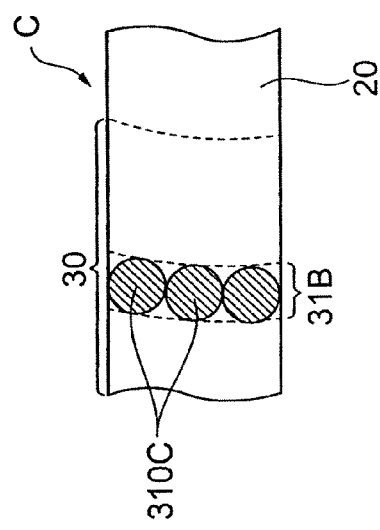
FIGS. 5A to 5C show the schematic structure of a third embodiment of an optical fiber according to the present invention; and, FIGS. 6A and 6B show the schematic structure of a fourth embodiment of an optical fiber according to the present invention.
Figure 5A:
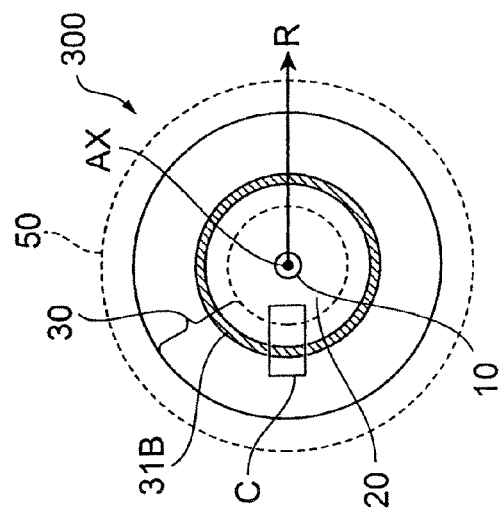
Figure 5B:
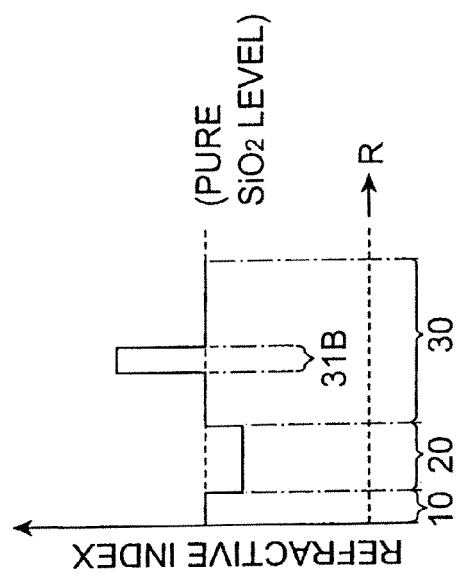

FIGS. 5A to 5C show the schematic structure of a third embodiment of an optical fiber according to the present invention. In the third embodiment, leaked light deflection control is performed by causing propagation, in the leakage reduction portion, of the leaked light which has arrived from the core region. FIG. 5A is a cross-sectional view showing the structure of the optical fiber 300 according to the third embodiment, and is equivalent to the cross-section along line I-I in FIG. 1. FIG. 5B is a refractive index profile of the optical fiber 300, and shows first means for achieving leaked light deflection control in the third embodiment. FIG. 5C is an enlarged view of the portion C in FIG. 5A, and shows second means for achieving leaked light deflection control in the third embodiment.

The optical fiber 300 according to the third embodiment comprises a core region extending along the optical axis AX, a cladding region provided on an outer periphery of the core region 10, and a resin coating (UV curable resin) 50 provided on an outer periphery of the cladding region. The cladding region is constituted by an optical cladding 20 provided directly on an outer periphery of the core region 10, and a physical cladding 30 provided on an outer periphery of the optical cladding 20. And, the physical cladding 30 includes a leakage reduction portion 31B to reduce the light quantity of leaked light propagating from the core region 10 toward the cladding region surface (on the side of the resin cover 50). With respect to the structure and function of the leakage reduction portion 31B, the optical fiber 300 according to the third embodiment differs from the optical fibers 100 and 200 according to the above-described first and second embodiments.

The leakage reduction portion 31B in the third embodiment functions to suppress propagation of leaked light to the resin coating 50, by causing propagation within the leakage reduction portion 31B of leaked light which has propagated from the core region 10.

The optical fiber 300 according to the third embodiment is also silica-based fiber, similar to the optical fiber 100 according to the first embodiment. As shown in FIG. 5A, the core region 10 and physical cladding 30 (excluding the leakage reduction portion 31B) both are composed of pure $SiO_2$. The core region 10 has an outer diameter of 8.5 µm. The optical cladding 20 is composed of $SiO_2$ doped with F, and the core region 10 has a relative refractive index difference, with respect to the refractive index of the optical cladding 20, of 0.35%. The outer diameter of the physical cladding 30 is 125 µm. An optical fiber 300 having such a structure has an MFD of 10.2 µm at wavelength of 1.55 µm. Further, the electric field amplitude in the optical fiber 300 has a peak value in the center of the core region 10 (equivalent to the optical axis AX), and the position at which the amplitude is $10^{-4}$ of the peak value is at a distance of 28.5 µm from the optical axis AX. Hence the leakage reduction portion 31B is provided within the physical cladding 30, while being apart from the optical axis AX in the radial direction by 25.5 µm (a distance equal to 5/2 times the MFD) or more, or being apart from the optical axis AX in the radial direction by 28.5 µm or more.

Particularly, in the optical fiber 300, the leakage reduction portion 31B is a ring-shape region formed in the range from 35 µm to 50 µm from the optical axis AX.

FIG. 5B is a refractive index profile of the optical fiber 300, showing the first means to achieve leaked light deflection control in the third embodiment. In this first means, deflection control for leaked light is performed by doping $GeO_2$ into the $SiO_2$ region equivalent to the leakage reduction portion 31B, as in the refractive index profile shown in FIG. 5B, to set the relative refractive index difference of the leakage reduction portion 31B with respect to the optical cladding 20 to +1.7%.

Further, FIG. 5C is an enlarged view of the portion C in FIG. 5A, showing second means to achieve leaked light deflection control in the third embodiment. In this second means, leaked light deflection control is performed by providing a plurality of high-refractive index regions 310C extending along the optical axis AX in the region equivalent to the leakage reduction portion 31B.

By doping a refractive index increaser into the leakage reduction portion 31B, or by replacement with high-refractive index regions, to cause function as a leaked light guiding region as in the above-described first and second means, the relative refractive index difference of the leakage reduction portion 31B with respect to the optical cladding 20 is significantly increased. As a result, part of the leaked light, propagating from the core region 10 toward the optical cladding 20 due to small-radius bending or another cause, propagates within the leakage reduction portion 31B, by coupling with a propagation mode of the leakage reduction portion 31B (the propagation direction of leaked light which has propagated from the core region 10 toward the side of the resin coating 50 is deflected). In the third embodiment, by appropriately placing a high-refractive index difference region 310C in the region equivalent to the leakage reduction portion 31B, light can be confined within the inside region surrounded by the leakage reduction portion 31B through the photonic bandgap effect.

Fourth Embodiment

FIGS. 6A and 6B show the schematic structure of a fourth embodiment of an optical fiber according to the present invention. In the fourth embodiment, leaked light deflection control is performed by causing an increase in scattering of the leaked light which has arrived from the core region. FIG. 6A is a cross-sectional view showing the structure of the optical fiber 400 according to the fourth embodiment, and is equivalent to a cross-section along line I-I in FIG. 1. FIG. 6B is an enlarged view of the portion D in FIG. 6A, and shows means for achieving leaked light deflection control in the fourth embodiment.

The optical fiber 400 according to the fourth embodiment comprises a core region extending along the optical axis AX, a cladding region provided on an outer periphery of the core region 10, and a resin coating (UV curable resin) 50 provided on an outer periphery of the cladding region. The cladding region is constituted by an optical cladding 20 provided directly on an outer periphery of the core region 10, and a physical cladding 30 provided on an outer periphery of the optical cladding 20. The physical cladding 30 includes a leakage reduction portion 31C to reduce the light quantity of leaked light propagating from the core region 10 toward the cladding region surface (on the side of the resin cover 50). With respect to the structure and function of this leakage reduction portion 31C, the optical fiber 400 according to the fourth embodiment differs from the optical fibers 100 to 300 according to the above-described first to third embodiments.

The leakage reduction portion 31C in the fourth embodiment functions to suppress propagation of leaked light to the resin coating 50, by causing scattering by the leakage reduction portion 31C of leaked light which has propagated from the core region 10.

The optical fiber 400 according to the fourth embodiment is also silica-based fiber, similar to the optical fiber 100 according to the first embodiment. As shown in FIG. 6A, the core region 10 is composed of $SiO_2$ doped with $GeO_2$. However, the core region 10 has an outer diameter of 30 µm, and has a relative refractive index difference of 1% with respect to the optical cladding 20. The optical cladding 20 and physical cladding 30 (excluding the leakage reduction portion 31C) both are composed of pure $SiO_2$. The outer diameter of the physical cladding 30 is 125 µm. Light propagating in an optical fiber 400 having such a structure is a multimode fiber at wavelength 1.55 µm, but the MFD of the fundamental mode is 19.8 µm. Further, the electric field amplitude in the optical fiber 400 has a peak value in the center of the core region 10 (equivalent to the optical axis AX), and the position at which the amplitude is $10^{-4}$ of the peak value is at a distance of 23.1 µm from the optical axis AX. Hence the leakage reduction portion 31C is provided within the physical cladding 30, while being apart from the optical axis AX in the radial direction by 49.5 µm (a distance equal to 5/2 times the MFD) or more, or being apart from the optical axis AX in the radial direction by 23.1 µm or more.

Particularly, in the optical fiber 400, the leakage reduction portion 31C is a ring-shape region formed in the range from 35 µm to 50 µm from the optical axis AX.

FIG. 6B is an enlarged view of the portion D in FIG. 6A, showing means for achieving leaked light deflection control in the fourth embodiment. In this means, leaked light deflection control is performed by causing an increase in scattering of leaked light through minute anisotropic members 310D doped into the region equivalent to the leakage reduction portion 31C. As such a leakage reduction portion 31C, for example, glass containing extended silver halide particles (minute anisotropic members 310D), described in Document 4: U.S. Pat. No. 4,304,584, may be used.

By doping the above minute anisotropic members 310D into the ring-shape leakage reduction portion 31C as described above, scattering of the leaked light in the leakage reduction portion 31C (as a result of which, the leaked light is deflected), and absorption of the leaked light (an advantageous result similar to that of the first embodiment), become greater than in other glass regions. Hence in the fourth embodiment also, the light quantity of leaked light which has passed through the leakage reduction portion 31C and propagates toward the resin coating 50 can be effectively reduced.

In an optical fiber according to the present invention, a leakage reduction portion is provided in physical cladding, which does not affect the transmission characteristics of light propagating within the core region, and the existence of this leakage reduction portion can achieve both prevention of resin coating combustion due to leaked light (reduction of the leaked light arriving at the optical fiber resin coating) and low-loss light transmission, which could not both easily be achieved in the above-described prior art. That is, the leaked light occurring due to small-radius bending is reduced by the leakage reduction portion provided in the physical cladding during propagation from the core region toward the outer surface of the optical fiber.

What is claimed is:

1. An optical fiber comprising:
    a core region extending along an optical axis; and
    a cladding region provided on an outer periphery of the core region,
    wherein the cladding region comprises: an optical cladding, as a region which affects transmission characteristics of light propagating through the core region, provided on the outer periphery of the core region; and a physical cladding, as a region which does not affect transmission characteristics of light propagating through the core region, provided on an outer periphery of the optical cladding,
    wherein the physical cladding includes a leakage reduction portion for suppressing the propagation, outside the cladding region, of leaked light which has arrived via the optical cladding from the core region,
    wherein, by causing the leaked light arriving from the core region to be deflected, the leakage reduction portion reduces the light quantity of leaked light which propagates outside the cladding region, and
    wherein the leakage reduction portion has a higher refractive index than those of the optical cladding and the physical cladding from which the leakage reduction portion is excluded, whereby the leaked light, which has arrived from the core region, propagates through the leakage reduction portion.

2. The optical fiber according to claim 1, wherein, in a cross-section of the optical fiber orthogonal to the optical axis, the leakage reduction portion is provided between a position, where a distance from the optical axis is 5/2 times the mode field diameter of the optical fiber at wavelength 1.55 μm, and an outer surface of the cladding region.

3. An optical fiber comprising:
    a core region extending along an optical axis; and
    a cladding region provided on an outer periphery of the core region,
    wherein the cladding region comprises: an optical cladding, as a region which affects transmission characteristics of light propagating through the core region, provided on the outer periphery of the core region; and a physical cladding, as a region which does not affect transmission characteristics of light propagating through the core region, provided on an outer periphery of the optical cladding,
    wherein the physical cladding includes a leakage reduction portion for suppressing the propagation, outside the cladding region, of leaked light which has arrived via the optical cladding from the core region,
    wherein, by causing the leaked light arriving from the core region to be deflected, the leakage reduction portion reduces the light quantity of leaked light which propagates outside the cladding region, and
    wherein the leakage reduction portion includes a minute anisotropic member, whereby the existence of the minute anisotropic member increases scattering of the leaked light which has arrived from the core region.

4. The optical fiber according to claim 3, wherein, in a cross-section of the optical fiber orthogonal to the optical axis, the leakage reduction portion is provided between a position, where a distance from the optical axis is 5/2 times the mode field diameter of the optical fiber at wavelength 1.55 and an outer surface of the cladding region.

* * * * *